United States Patent [19]
Xu

[11] Patent Number: 5,282,969
[45] Date of Patent: Feb. 1, 1994

[54] HIGH PRESSURE FEED MEMBRANE SEPARATION PROCESS

[75] Inventor: Jianguo Xu, Fogelsville, Pa.

[73] Assignee: Permea, Inc., St. Louis, Mo.

[21] Appl. No.: 55,070

[22] Filed: Apr. 29, 1993

[51] Int. Cl.$^5$ .............................................. B01B 53/22
[52] U.S. Cl. .................................. 210/640; 210/641; 95/45
[58] Field of Search .................... 55/16; 210/634, 640, 210/641, 644, 649-654, 321.64

[56] References Cited

PUBLICATIONS

N. I. Laguntsov, et al, The Use of Recycle permeator for gas mixture separation 1992, pp. 15-28.

*Primary Examiner*—Frank Sever
*Attorney, Agent, or Firm*—Robert J. Wolff; James C. Simmons; William F. Marsh

[57] ABSTRACT

A process is set forth for the separation of one or more, more permeable components from one or more, less permeable components in a feed stream. The process suggests three membrane separation stages in series and is suitable for high pressure feed applications.

4 Claims, 3 Drawing Sheets

HIGH PRESSURE FEED MEMBRANE SEPARATION PROCESS

TECHNICAL FIELD

The present invention relates to a membrane separation process which uses a plurality of semi-permeable membranes in series for the separation of one or more, more permeable components from one or more, less permeable components in a feed stream. As used herein, the term component generally refers to, but is not limited to, a component in the gaseous state.

BACKGROUND OF THE INVENTION

Membrane separation processes which use a plurality of semi-permeable membranes in series for the separation of one or more, more permeable components from one or more, less permeable components in a feed stream are known in the art. A state of the art example in commercial use today is the "series type two unit separation cell" process as shown in FIG. 1 which recovers both the permeable and non-permeable components at desired purity while using an optimum combination of power and membrane area vis-a-vis any comparable process. A disadvantage of FIG. 1's process is that it usually has mixing of streams with different compositions and its attendant energy loss.

U.S. patent application Ser. No. 07/933,152 by Xu introduces the concept of a compressed permeate sweep which can significantly improve the energy efficiency of membrane separation processes at the expense of increased membrane area. One particular application of Xu to FIG. 1 results in the process as shown in FIG. 2. When compared to FIG. 1's process for a typical separation, FIG. 2 was 24% more energy efficient at the expense of a 58% increase in membrane area.

U.S. patent application Ser. No. 08/090,376, also by Xu, teaches a membrane separation process as shown in FIG. 3 which is specifically designed for low pressure feed applications. More specifically, FIG. 3 is suitable for applications where the pressure of the feed stream is lower than the higher pressure side of the membrane separation module. When compared to FIG. 1's process for a typical separation, FIG. 3 was 4% more energy efficient and required 5% less membrane area.

Laguntsov et al in the Journal of Membrane Science (v 67, pp 15–28, 1992) teach a membrane separation process as shown in FIG. 4 which is specifically designed for high pressure feed applications. More specifically, FIG. 3 is suitable for applications where the pressure of the feed stream is equal to the pressure of the higher pressure side of the membrane separation module. In theory, FIG. 4 can avoid energy loss for binary feed mixtures at certain combinations of feed composition, membrane selectivity and product purities. At other combinations, however, FIG. 4 is unable to avoid energy loss due to the mixing of the feed stream with the stream that is recycled to the feed stream. In such cases, other schemes have to be developed to avoid such mixing losses. It is an object of the present invention to develop such a scheme. More specifically, it is an object of the present invention to recover either or both of the permeable and non-permeable components at desired purity while using an optimum combination of power and membrane area vis-a-vis any comparable process.

SUMMARY OF THE INVENTION

The present invention is a process for the separation of one or more, more permeable components from one or more, less permeable components in a feed stream comprising recovering either or both of the permeable and non-permeable components at predetermined purities while using an optimum combination of power and membrane area by:

(a) introducing the feed stream into a first membrane separation module comprising a high pressure side separated from a low pressure side by a semi-permeable membrane which is selective for the permeation of the more permeable component(s) wherein the feed stream is more specifically introduced into the high pressure side of the first module;

(b) withdrawing from the high pressure side of the first module a first non-permeate stream which is enriched in the less permeable component(s);

(c) introducing the first non-permeate stream into a second membrane separation module comprising a high pressure side separated from a low pressure side by a semi-permeable membrane which is selective for the permeation of the more permeable component(s) wherein the first non-permeate stream is more specifically introduced into the high pressure side of the second module;

(d) withdrawing from the high pressure side of the second membrane separation module a second non-permeate stream which is further enriched in the less permeable component(s);

(e) withdrawing from the low pressure side of the second module a first permeate stream enriched in the more permeable component(s);

(f) compressing the first permeate stream and introducing the compressed first permeate stream into a third membrane separation module comprising a high pressure side separated from a low pressure side by a semi-permeable membrane which is selective for the permeation of the more permeable component(s) wherein the compressed first permeate stream is more specifically introduced into the high pressure side of the third module;

(g) withdrawing from the low pressure side of the first membrane separation module a second permeate stream which is further enriched in the more permeable component(s);

(h) introducing the second permeate stream into the low pressure side of the third module;

(i) withdrawing from the high pressure side of the third module a third non-permeate stream which is recycled to the feed stream; and finally (j) withdrawing from the low pressure side of the third module a third permeate stream which is yet further enriched in the more permeable component(s).

BRIEF DESCRIPTION OF THE DRAWINGS

Each of the seven figures contains at least two membrane separation modules in series. Each membrane separation module is depicted as a square and comprises a high pressure side separated from a low pressure side by a semi-permeable membrane which is selective for the permeation of the more permeable component(s) in the feed stream. To better understand these figures, it is important to understand that the dotted arrow in each square represents the permeate stream permeating from the high pressure side to the low pressure side.

FIG. 5 is the simplest embodiment of the present invention in that it exclusively comprises steps (a) thru (j) of claim 1.

DETAILED DESCRIPTION OF THE INVENTION

Figure 5:
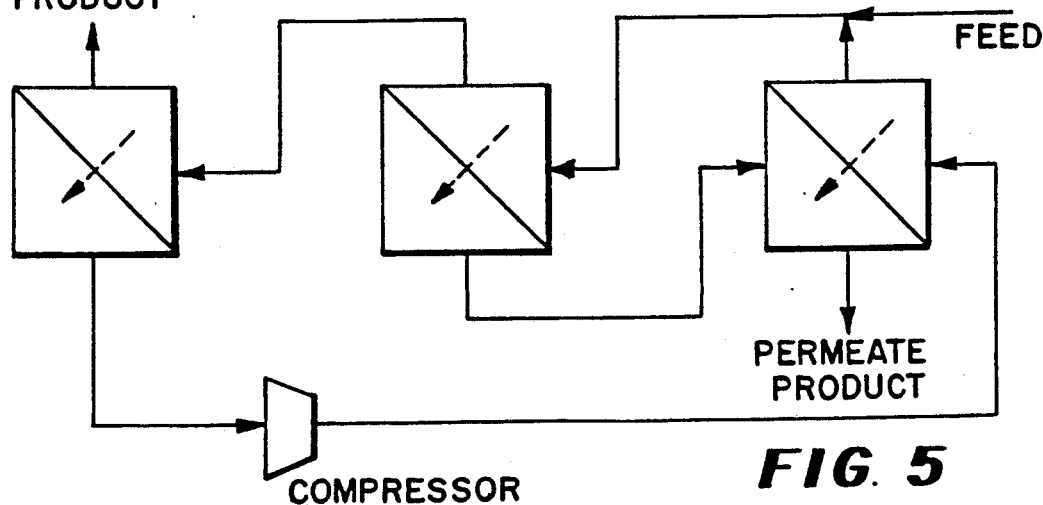
FIG. 5 is a schematic diagram illustrating one embodiment of the present invention.

The process of the present invention will now be described in detail with reference to FIG. 5. As noted above, FIG. 5 is the simplest embodiment of the present invention in that it exclusively comprises steps (a) through (j) of claim 1. Referring now to FIG. 5, the feed stream is introduced into a first membrane separation module comprising a high pressure side separated from a low pressure side by a semi-permeable membrane which is selective for the permeation of the more permeable component(s) in the feed stream. The feed stream is more specifically introduced into the high pressure side of the first module. A first non-permeate stream enriched in the less permeable component(s) is withdrawn from the high pressure side of the first module and subsequently introduced into the high pressure side of a second membrane separation module. A second non-permeate stream (which is further enriched in the less permeable component(s) vis-a-vis the first non-permeate stream) is recovered from the high pressure side of the second module as the non-permeate product. A first permeate stream enriched in the more permeable component(s) is withdrawn from the low pressure side of the second module, compressed in the compressor and subsequently introduced into the high pressure side of a third membrane separation module. A second permeate stream (which is further enriched in the more permeable component(s) vis-a-vis the first permeate stream) is withdrawn from the low pressure side of the first membrane separation module and subsequently introduced into the low pressure side of the third module. A third non-permeate stream having a feed like composition is withdrawn from the high pressure side of the third module and is subsequently recycled to the feed stream. Finally, a third permeate stream (which is yet further enriched in the more permeable component(s) vis-a-vis the first and second permeate streams) is withdrawn from the low pressure side of the third module as the permeate product. As shown in FIG. 5, the above described steps are operated as a continuous cycle.

Figure 2:
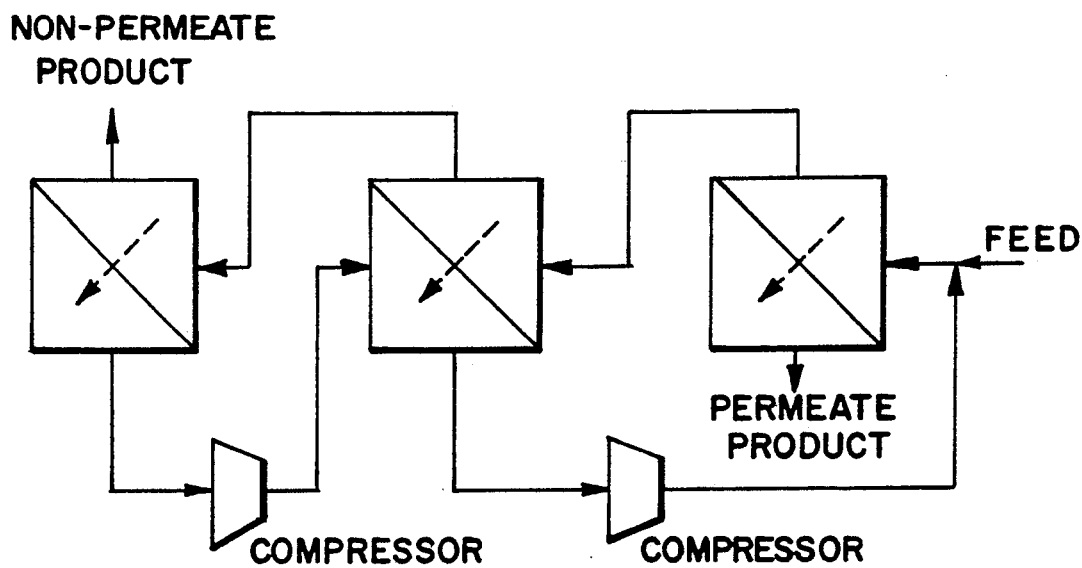
FIG. 2 is a schematic diagram showing the result of applying the teaching of U.S. patent application Ser. No. 07/933,152 by Xu to FIG. 1.
Figure 3:
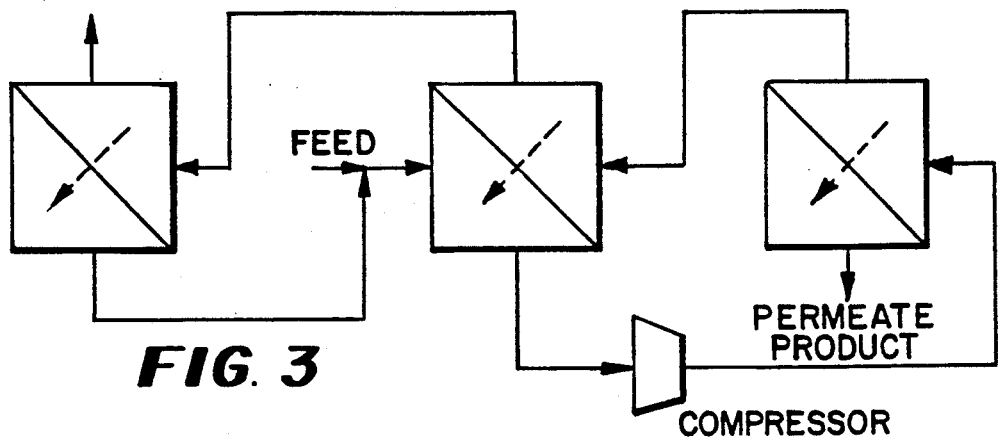
FIG. 3 is a schematic diagram of one embodiment of the membrane separation process taught in U.S. patent application Ser. No. 08/090,376 also by Xu.
Figure 4:
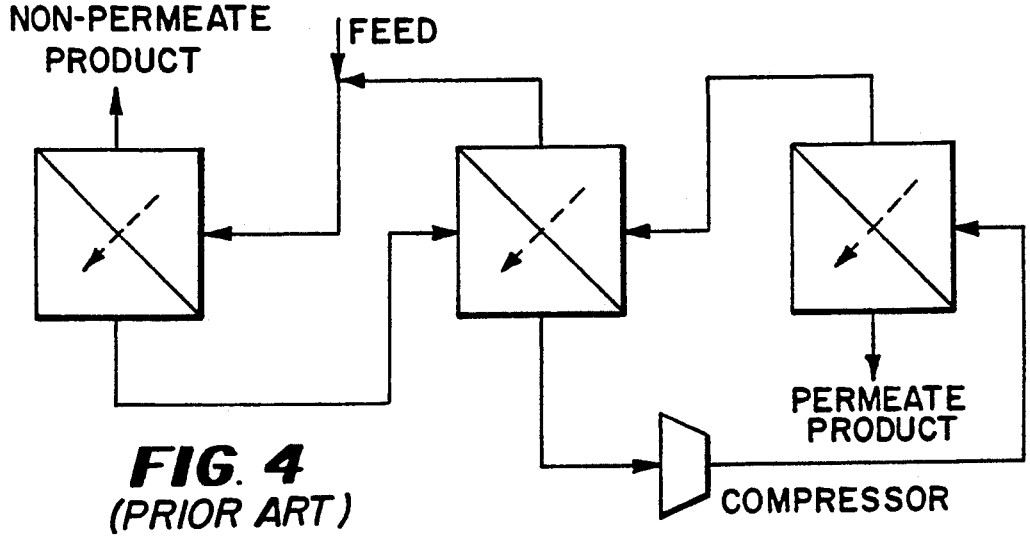
FIG. 4 is a schematic diagram of the prior art membrane separation process taught by Laguntsov et al in the Journal of Membrane Science.
Figure 6:
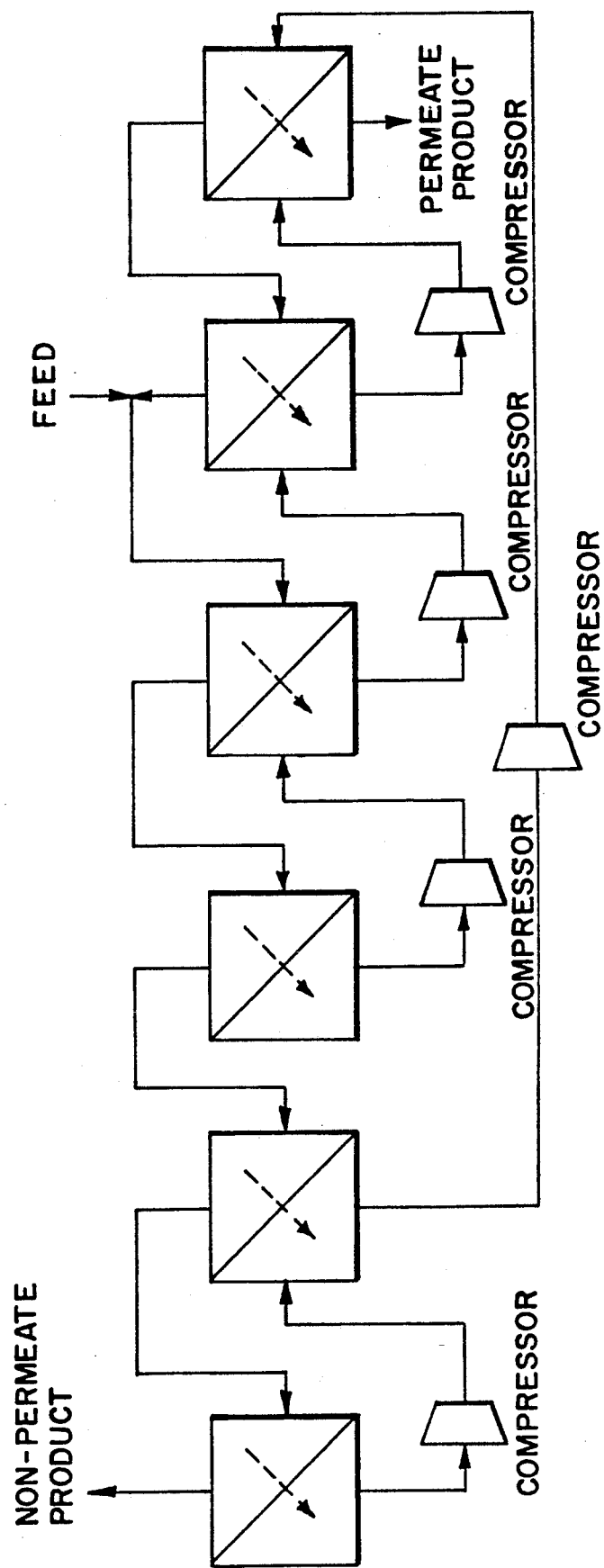
FIG. 6 is a schematic diagram illustrating a second embodiment of the present invention wherein the teaching of U.S. patent application Ser. No. 07/933,152 by Xu has been applied to each of FIG. 5's three modules.

FIG. 6 is a schematic diagram illustrating a second embodiment of the present invention. FIG. 3 is identical to FIG. 2 except that it incorporates the teaching of U.S. patent application Ser. No. 07/933,152 with respect to each of the three modules in FIG. 5. In particular, each of the three modules in FIG. 5 is divided into two stages such that the permeate stream from one stage is compressed before being introduced as a sweep stream to the next stage.

It should also be noted that the characteristics of the membranes in FIG. 5 do not always have to be the same. For example, the selectivity of the membranes in the right side and middle modules of FIG. 5 can be higher than that of the left side module.

The following example is offered to demonstrate the efficacy of the present invention.

EXAMPLE

Figure 1:
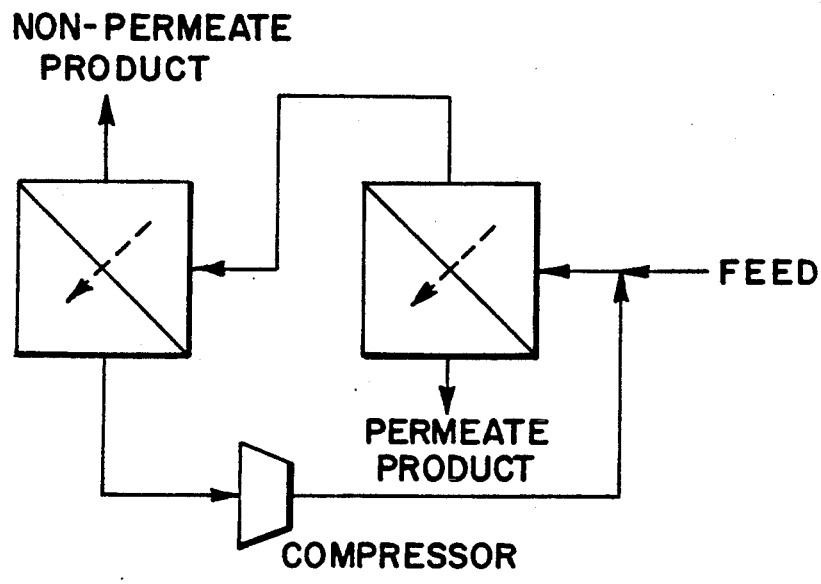
FIG. 1 is a schematic diagram of a prior art membrane separation process known in the art as the "series type two unit separation cell".

The purpose of this example is to demonstrate the improved efficiency of the present invention (as embodied in FIG. 5) over the prior art (as embodied in FIG. 1). This was accomplished by performing computer simulations for FIG.'s 1 and 5. Table 1 summarizes the common feed and product streams in each simulation, Table 2 summarizes the common inlet and outlet pressures for the single compressor in each simulation and Table 3 summarizes the common membrane characteristics in each simulation. Both simulations assume zero pressure drops in their respective systems as well as a counter-current flow pattern between the flows on the high pressure side and low pressure side of each separation module. Table 4 summarizes the relative power and membrane area for the two simulations. As shown in Table 4, FIG. 5 enjoys a 32% advantage in energy efficiency and a 13% advantage in membrane area over FIG. 1.

TABLE 1

|  | Flow (lb moles/hr) | Pressure (psia) | Composition (mole %) | |
|---|---|---|---|---|
|  |  |  | Hydrogen | Carbon Monoxide |
| Feed Stream | 100.0 | 402.7 | 60.0 | 40.0 |
| Permeate Product | 60.2 | 41.7 | 99.0 | 1.0 |
| Non-Permeate Product | 39.8 | 402.7 | 1.0 | 99.0 |

TABLE 2

|  | Inlet Pressure (psia) | Outlet Pressure (psia) |
|---|---|---|
| Compressor | 22.7 | 402.7 |

TABLE 3

|  | Selectivity | Permeability of Hydrogen (standard $cm^3/cm^2 \cdot sec \cdot cm\ Hg$) |
|---|---|---|
| Membrane Characteristics | 38 | $95 \times 10^{-6}$ |

TABLE 4

|  | Relative Power | Relative Membrane Area |
|---|---|---|
| FIG. 1 | 1.0 | 1.0 |
| FIG. 5 | 0.68 | 0.87 |

It should be noted that the scheme taught in U.S. patent application Ser. No. 08/090,376 is not suitable for the above example because of the high feed pressure in relation to the product pressure. Also, the scheme taught by Laguntsov et al in the Journal of Membrane Science is not suitable either since at the conditions used, one is unable to avoid the mixing loss associated with the mixing of the feed stream with the stream that is recycled to the feed stream.

The present invention has been described with reference to two specific embodiments thereof. These embodiments should not be seen as a limitation of the scope of the present invention; the scope of such being ascertained by the following claims.

I claim:

1. A process comprising: separating one or more, more permeable components from one or more, less permeable components in a feed stream comprising recovering either or both of the permeable and non-permeable components at predetermined purities while using an optimum combination of power and membrane area by:
   (a) introducing the feed stream into a first membrane separation module comprising a high pressure side separated from a low pressure side by a semi-permeable membrane which is selective for the permeation of the more permeable component(s) wherein the feed stream is more specifically introduced into the high pressure side of the first module;
   (b) withdrawing from the high pressure side of the first module a first non-permeate stream which is enriched in the less permeable component(s);
   (c) introducing the first non-permeate stream into a second membrane separation module comprising a high pressure side separated from a low pressure side by a semi-permeable membrane which is selective for the permeation of the more permeable component(s) wherein the first non-permeate stream is more specifically introduced into the high pressure side of the second module;
   (d) withdrawing from the high pressure side of the second membrane separation module a second non-permeate stream which is further enriched in the less permeable component(s);
   (e) withdrawing from the low pressure side of the second module a first permeate stream enriched in the more permeable component(s);
   (f) compressing the first permeate stream and introducing the compressed first permeate stream into a third membrane separation module comprising a high pressure side separated from a low pressure side by a semi-permeable membrane which is selective for the permeation of the more permeable component(s) wherein the compressed first permeate stream is more specifically introduced into the high pressure side of the third module;
   (g) withdrawing from the low pressure side of the first membrane separation module a second permeate stream which is further enriched in the more permeable component(s);
   (h) introducing the second permeate stream into the low pressure side of the third module;
   (i) withdrawing from the high pressure side of the third module a third non-permeate stream which is recycled to the feed stream; and finally
   (j) withdrawing from the low pressure side of the third module a third permeate stream which is yet further enriched in the more permeable component(s).

2. The process of claim 1 wherein steps (a) through (g) are operated as a continuous cycle.

3. The process of claim 1 wherein the selectivity towards the more permeable component(s) of the semi-permeable membrane in the first module is different than the selectivity towards the more permeable component(s) of the semi-permeable membrane in the second module.

4. The process of claim 1 wherein one or more of the modules is divided into a plurality of stages such that the permeate stream from one stage is compressed before being introduced as a sweep stream to the next stage.

* * * * *